United States Patent

Garvert

[11] Patent Number: 5,549,312
[45] Date of Patent: Aug. 27, 1996

[54] TRUCK TAILGATE STEP ATTACHMENT

[76] Inventor: Clarence F. Garvert, 1013 N. Second St., Garden City, Kans. 67846

[21] Appl. No.: 376,225

[22] Filed: Jan. 23, 1995

[51] Int. Cl.⁶ .................................................. B60R 3/02
[52] U.S. Cl. ............................................. 280/166; 296/62
[58] Field of Search ................................... 280/166, 163, 280/164.1; 296/62; 182/91, 127

[56] References Cited

U.S. PATENT DOCUMENTS

| 560,752 | 5/1996 | Prator . | |
|---|---|---|---|
| 1,792,586 | 2/1931 | Higgins | 280/166 |
| 2,809,849 | 10/1957 | Benne | 280/166 |
| 3,606,382 | 9/1971 | Pollock . | |
| 3,853,369 | 12/1974 | Holden . | |
| 3,858,905 | 1/1975 | Peebles . | |
| 3,889,997 | 6/1975 | Schoneck | 296/62 |
| 3,927,903 | 12/1975 | Jones | 280/166 |
| 4,191,388 | 3/1980 | Barksdale | 280/166 |
| 4,264,084 | 4/1981 | Telles | 280/166 |
| 4,527,941 | 7/1985 | Archer . | |
| 4,757,876 | 7/1988 | Peacock | 280/166 X |
| 4,795,304 | 1/1989 | Dudley . | |
| 4,813,842 | 3/1989 | Morton . | |
| 4,846,487 | 7/1989 | Criley | 280/166 |
| 5,028,063 | 7/1991 | Andrews | 280/166 |

FOREIGN PATENT DOCUMENTS

| 0673492 | 7/1979 | U.S.S.R. | 280/166 |

Primary Examiner—Brian L. Johnson
Attorney, Agent, or Firm—Shook, Hardy & Bacon

[57] ABSTRACT

A folding step attachment made of lightweight tubular metal provides improved entry access into the bed area of a truck. The attachment is secured at its base to the interior surface of the truck tailgate. A frame coupled to the base unfolds downwardly from the tailgate to an operative position whereupon a step coupled to the frame unfolds into a horizontal position to accommodate a user's foot. The step is adjustable to a desired height above the ground. In the folded or stand-by position, the attachment consumes little space in the bed area. An angle member is provided between the attachment and the upper edge of the tailgate to protect the tailgate against denting.

4 Claims, 2 Drawing Sheets

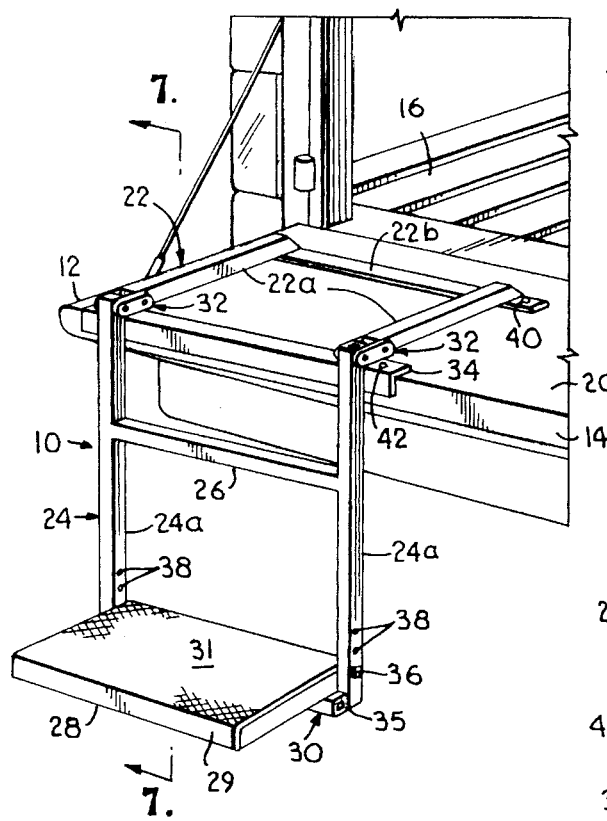
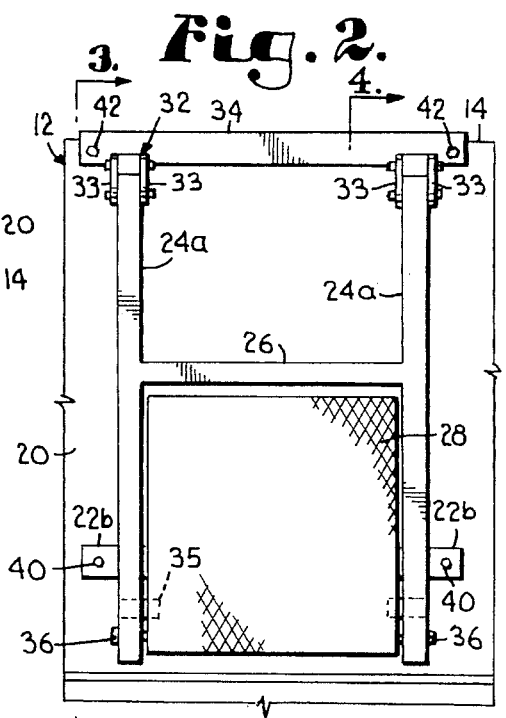
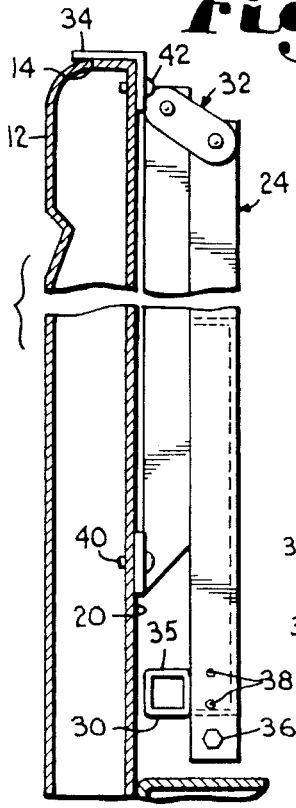
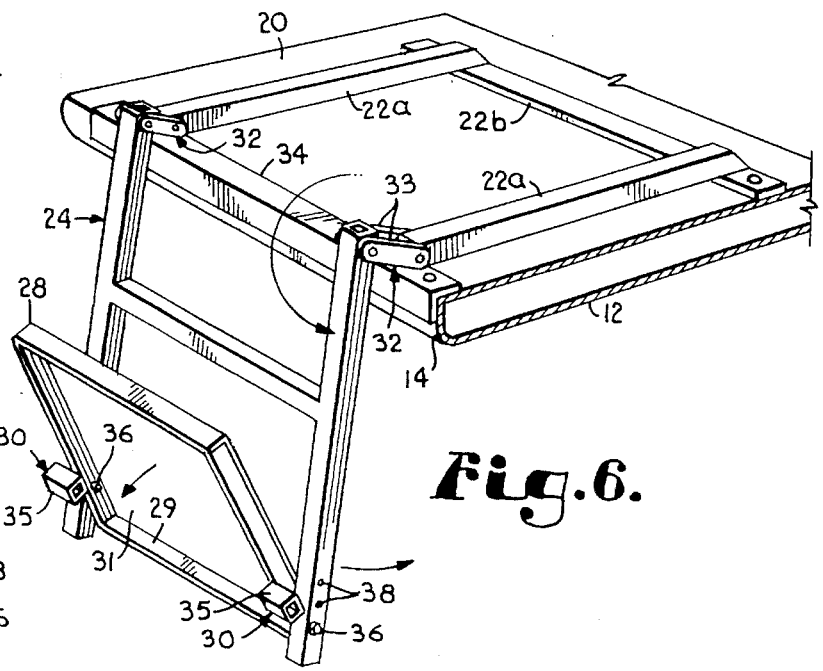

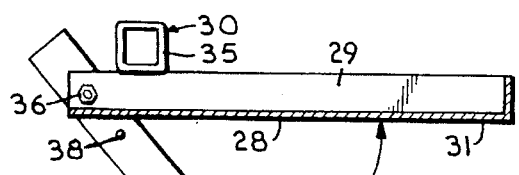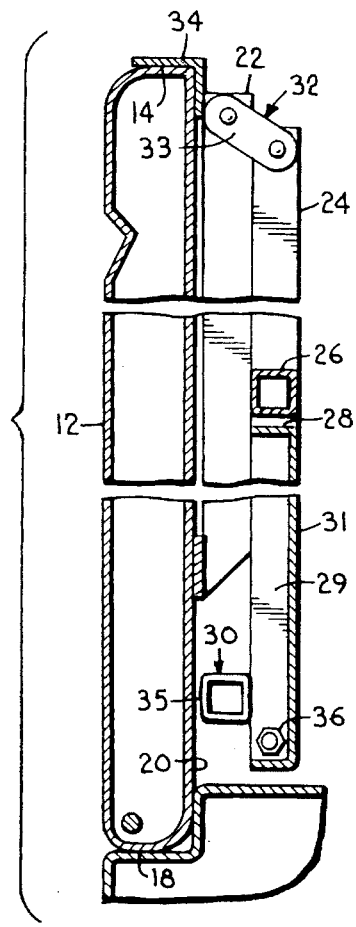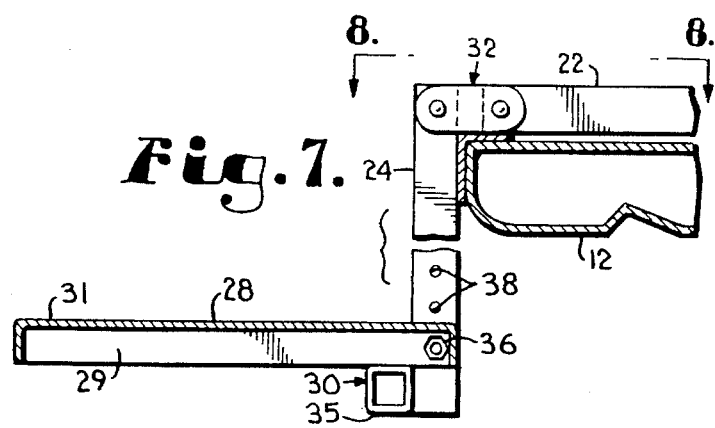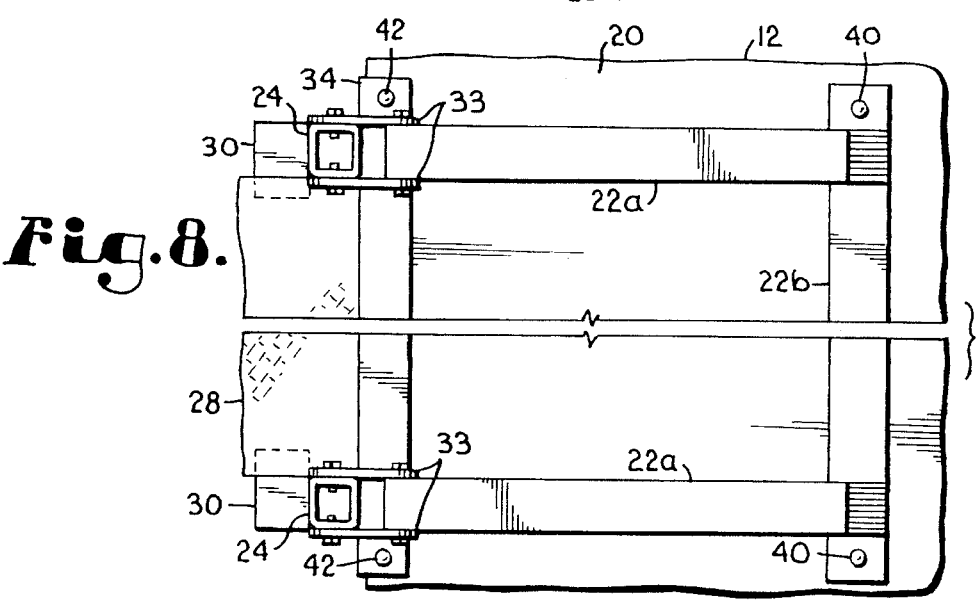

5,549,312

TRUCK TAILGATE STEP ATTACHMENT

FIELD OF THE INVENTION

This invention relates to a vehicle entry accessory and more particularly to a foldable step attachment for entering a truck bed.

BACKGROUND OF THE INVENTION

Small trucks have been popular with consumers for many years. The pick-up truck in particular has enjoyed strong sales. Such trucks typically have a front cab area for the occupants and a bed area behind the cab. The bed area is often used for hauling items and typically has a hinged tailgate on the rear of the truck to provide entry into the bed.

Users frequently wish to enter the truck bed area to facilitate loading or unloading of items. In the open, generally horizontal position, the tailgate is typically several feet above the ground. For many users, this distance impedes comfortable entry into the bed area. The desirability of having a step to aid entry into a vehicle has long been recognized. For example, it has been known to employ steps to provide entry access to the interior of vehicles, such as recreational vehicles. It has also been known to provide step bumpers for facilitating entry access to a truck bed when the truck tailgate is in the closed or upward position. When such a step is unavailable, a user may use whatever assisting accessory that may be available, such as a step ladder, a cinder block or similar item to aid entry into the bed area.

The above approaches present limitations. When the tailgate is in the open position, step bumpers or similar step arrangements are largely inaccessible to a user wishing to step up into the truck bed. Furthermore, if carried in the truck, step ladders and comparable devices can take up undesirable amounts of storage space in a bed area. They can also be relatively unstable during use. Accordingly, a convenient, stable entry accessory is needed that is well-suited for use with a truck tailgate when the tailgate is in the open, generally horizontal position.

SUMMARY AND OBJECTS OF THE INVENTION

The present invention provides a truck tailgate step attachment that is adapted to be mounted to the interior surface of a truck tailgate. It consumes little space in the bed area, folding easily into a compact, convenient stand-by position. Being mounted to the tailgate interior, it is sturdy and readily accessible when needed. The attachment of the present invention resists undesirable movement during use that could cause a user to lose his balance. Furthermore, in the stand-by position, the attachment presents no objectionable protrusions above the upper edge of the tailgate that could interfere with loading and unloading of items from the truck bed. Similarly, the attachment in its stand-by position does not adversely affect the appearance of the truck. In addition, the attachment which embodies the invention provides a convenient means for adjusting the height of the step above the ground to further ease the user's entry into the bed area.

Accordingly, it is an object of this invention to provide a folding step for facilitating entry into a truck bed when the truck tailgate is in the open, generally horizontal position.

It is another object of this invention to provide a truck step attachment that can be securely attached to the truck tailgate to be readily and reliably available for use. It is a related object to provide an attachment that is easily and quickly deployed for immediate use.

It is an object of this invention to provide a truck step attachment that folds to a compact, stand-by position consuming little space in the bed area. It is a related object to provide an attachment that does not interfere with the appearance of a vehicle to which it is attached. It is a further related object of this invention to provide an attachment that, when in the stand-by position, presents no objectionable protrusions to interfere with the loading and unloading of items from the bed.

It is another object of this invention to provide a step attachment for a truck tailgate that is lightweight and stable and that resists objectionable movement during use.

A yet further object of the invention is to provide a truck attachment with a step having an adjustable height above the ground to better facilitate use of the attachment by a variety of users.

Still another object of the invention is to provide a truck step attachment that is economical to manufacture and easy to install with readily available fasteners.

These and other objects of the present invention will be further explained or will become apparent from the following description.

BRIEF DESCRIPTION OF THE DRAWINGS

FIG. 1 is a fragmentary perspective view on a reduced scale of a truck showing a step attachment embodying this invention in its operative position secured to the truck tailgate.

FIG. 2 is a fragmentary elevational view of the truck tailgate showing the attachment of FIG. 1, but in its stand-by position with the truck tailgate in its closed position.

FIG. 3 is an enlarged fragmentary, detailed cross-sectional view taken along line 3—3 of FIG. 2.

FIG. 4 is a view similar to FIG. 3, but taken along line 4—4 of FIG. 2.

FIG. 5 is a fragmentary end elevational view of the truck tailgate showing the attachment embodying the present invention in its partially unfolded position, the directions of movement of component parts being designated by arrows.

FIG. 6 is a view similar to FIG. 1, but on a larger scale and showing the attachment in a partially unfolded condition.

FIG. 7 is an enlarged fragmentary, detailed cross-sectional view taken along line 7—7 of FIG. 1. FIG. 8 is a view taken along line 8—8 of FIG. 7.

DETAILED DESCRIPTION OF PREFERRED EMBODIMENTS

An attachment embodying the principles of this invention is broadly designated by the reference numeral 10 in FIG. 1. Attachment 10 includes a base 22, a frame 24 swingably coupled to base 22 and a step member 28 swingably carried by frame 24. In a preferred embodiment, base 22 generally comprises elongated members in mutually spaced apart, substantially rectangular disposition. As shown in FIG. 1, base 22 comprises elongated tubular base members 22a welded or otherwise secured atop elongated flat base member 22b. Members 22a are in generally parallel, mutually spaced apart disposition and in generally perpendicular disposition to member 22b.

Base 22 is mounted to tailgate 12, which, as shown in FIG. 4, has an upper edge 14, a lower edge 18 and an interior surface 20. Tailgate 12 is swingably secured at lower edge 18 for movement between a closed position as shown in FIG. 2 extending generally vertically, with interior surface 20 facing bed 16, and an open position as shown in FIG. 1 extending generally horizontally, with interior surface 20 facing upwardly. Fasteners 40 are used to secure base 22 to the tailgate interior surface 20. Commonly available metal fasteners, such as sheet metal screws or the like, are employed for this purpose to suitably fasten the base to the sheet metal, which typically comprises the interior surface of the tailgate. When base 22 is so mounted, members 22a are generally perpendicular to upper edge 14 of tailgate 20. One end of each member 22a is also proximal upper edge 14.

Frame 24 comprises generally planar, elongated rigid tubular members 24a in mutually spaced apart disposition. An elongated rigid tubular cross-member 26 spans horizontally between frame members 24a and is welded or otherwise secured to each frame member to provide strength and stability. Each elongated frame member 24a is swingably secured at one end to a corresponding tubular base member 22a. Frame 24 is mounted so that it is spaced sufficiently from lower edge 18 of tailgate 12 to permit frame 24 to hang substantially parallel to interior surface 20 when tailgate 12 is in the closed position.

Proximal the other end of each frame member 24a, the frame member is provided with apertures 38 extending substantially horizontally transversely through the frame member. The apertures 38 in each frame member 24a are mutually spaced apart longitudinally along the frame member. Each aperture 38 in one frame member 24a is aligned with a corresponding aperture 38 in the other frame member 24a to form a pair of aligned apertures. Suitable materials for constructing frame 24 include tubular steel or the like.

A step member 28 is swingably attached to frame 24. Step 28 comprises a peripherally extending, rigid, tubular frame 29 covered by sheet metal 31 preferably having a top surface embossed with a non-skid pattern. Step 28 is sized to fit between frame members 24a when step 28 is swung to a closed position as shown in FIGS. 2 and 4 of the drawings. Step 28 is coupled to frame 24 by a pair of pins 36, each of which is insertable through its corresponding one of a pair of aligned apertures 38 in members 24a. Pins 36 are received through corresponding apertures in frame 29 to swingably attach step 28 to frame 24. Furthermore, step 28 may be attached by using whichever pair of apertures 38 may be chosen to dispose step 28 at a desired height when the frame is in the open position.

Attachment 10 includes means for preventing the downward swinging of step 28 beyond a generally horizontal disposition when frame 24 is in the operative position. As shown in the drawings, the limit for downward swinging of step 28 is provided by a stop 30 comprising a pair of components 35, each being affixed to frame 29 as shown in the drawings in disposition to engage a corresponding frame member 24a when step 28 is swung to the operative, generally horizontally position. Each component 35 of stop 30 may comprise a section of metal tubing welded or otherwise securely affixed to step 28.

Hinge means, such as hinges 32, are employed to swingably secure frame 24 to base 22. The hinges enable frame 24 to swing about an axis generally parallel to upper edge 14 of tailgate 12. Each hinge 32 comprises a pair of elongated, rigid parallel elements 33 pivotably attached to base 22 proximal upper edge 14. The other end of each hinge element 32 is pivotably attached to a corresponding frame member 24a proximal upper edge 14. Hinges 32 span the distance between base member 22a and its corresponding frame member 24a to allow the latter to clear upper edge 14 of tailgate 12 when frame 24 is swung to the operative position. Hinges 32 are also sized and positioned to be able to prevent frame 24 from swinging downwardly beyond a substantially upright position.

To provide a guard against the denting of upper edge 14 of tailgate 12, an elongated, rigid angle element 34 is provided and secured proximal upper edge 14. Element 34 is positioned to prevent hinge 32 or frame 24 from denting or marring the upper edge 14 of the tailgate. Element 34 may, if desired, be welded or otherwise secured to base 22 to provide additional strength and stability to attachment 10. Element 34 can be made from commonly available angle iron or the like. Element 34 can be mounted to tailgate 12 using suitable fasteners 42 in the nature of screws, bolts, rivets or the like.

In operation, attachment 10 embodying the principles of the present invention is stored in a stand-by position secured to a truck tailgate as illustrated in FIGS. 2–4. In the illustrated position, tailgate 12 is in its upright or closed position. Attachment 10 hangs substantially parallel to interior surface 20, taking up minimal space in bed 16. In this stand-by position, step 28 lies generally parallel to the plane of frame 24 as shown in FIGS. 2–4 to minimize the space occupied by the attachment when the frame is in this stand-by position.

Tailgate 12 is opened to the horizontal position as shown in FIG. 1. The attachment is then manually swung from its stand-by position to its operative position as shown in FIG. 1. Thus, frame 24 is manually swung to the operative position wherein the frame hangs downwardly from the tailgate toward the ground. Step 28 is then manually swung to the operative position wherein it projects outwardly from frame 24 in disposition to support the foot of a user to aid entry into the bed 16.

When step 28 reaches a generally horizontal position with respect to the ground, stop 30 prevents its further downward travel by virtue of the stop components engaging the corresponding frame members.

The ends of the tubular members described above may optionally be closed by commonly available end plugs made of any suitable material, such as plastic, to enhance the appearance, safety and durability of the members. Alternatively, it may be desirable to longitudinally bevel the ends of tubular base members 22a proximal lower edge 18 of tailgate 12 so that the ends slope downwardly as shown in the drawings. If end plugs which fit the beveled ends are not readily available, the beveled ends may be closed by welded covers or by any other suitable means.

Having thus described the invention, I claim:

1. An attachment for a truck tailgate to provide a step for entering a truck bed, the tailgate having spaced apart upper and lower edges and an interior surface, the attachment comprising:

a unitary base adapted to be secured to the interior surface of the tailgate, the base having two spaced apart elongated members extending generally perpendicular to the upper and lower edges, said elongated members rigidly secured to an elongated support that holds said elongated members in a spaced apart relationship;

a generally planar frame having two spaced apart elongated bars, each bar lying in generally the same vertical plane as a corresponding one of said base elongated members, said frame capable of being folded into a stand-by position so that each frame bar is juxtaposed on a corresponding base member and so that said frame lies generally parallel to the interior surface of the tailgate, but does not contact the interior surface of the tailgate;

a pair of rigid elongated hinge elements, each hinge element pivotally attached on one end to a corresponding base elongated member and pivotally attached on the other end to a corresponding frame bar, said hinge elements spanning the distance between the base elongated members and the corresponding frame bars to allow the latter to clear the upper edge of the tailgate when said frame is swung to an operative position and allowing said frames to be juxtaposed on their corresponding base members when said frame is in the stand-by position;

a step member swingably carried by said frame to permit the step member to be folded into the stand-by position lying generally parallel to the plane of said frame to minimize the space occupied by the attachment when said frame is a stand-by position;

wherein said frame is manually swingable to an operative position hanging downwardly from the tailgate toward the ground when the tailgate is in an open generally horizontal position and said step member being manually swingable to an operative position projecting outwardly from said frame in disposition to support the foot of a user to aid entry into the truck bed when said frame is hanging from the open tailgate.

2. The attachment set forth in claim 1, wherein each elongated frame bar is provided with a plurality of apertures, each aperture extending substantially horizontally transversely through a corresponding frame bar, the apertures in each frame bar being mutually spaced apart longitudinally of the corresponding frame bar and each aperture in one frame bar being aligned with a corresponding aperture in the other frame bar to form a pair of aligned apertures, and pin means insertable through a pair of aligned apertures to swingably attach the step member to the frame, whereby the step member may be attached with a pair of apertures so selected to dispose the step member at a desired height when the frame is in the operative position.

3. The attachment set forth in claim 2, further comprising means for preventing the downward swinging of said step member beyond a generally horizontal disposition when said frame member is in the operative position.

4. The attachment set forth in claim 3, wherein said preventing means comprises a stop carried by said step member in disposition to engage a corresponding frame member when the step member is swung to the operative position, said stop comprising a section of metal tubing affixed to the step member.

\* \* \* \* \*